(12) United States Patent
Gunther et al.

(10) Patent No.: US 8,911,226 B2
(45) Date of Patent: Dec. 16, 2014

(54) DEVICE FOR PRODUCING THREE-DIMENSIONAL MODELS

(75) Inventors: Daniel Gunther, Munich (DE); Johannes Gunther, Augsburg (DE)

(73) Assignee: Voxeljet AG, Friedberg (DE)

( * ) Notice: Subject to any disclaimer, the term of this patent is extended or adjusted under 35 U.S.C. 154(b) by 39 days.

(21) Appl. No.: 13/640,127

(22) PCT Filed: Apr. 11, 2011

(86) PCT No.: PCT/DE2011/000385
§ 371 (c)(1),
(2), (4) Date: Oct. 9, 2012

(87) PCT Pub. No.: WO2011/127900
PCT Pub. Date: Oct. 20, 2011

(65) Prior Publication Data
US 2013/0029001 A1   Jan. 31, 2013

(30) Foreign Application Priority Data
Apr. 14, 2010   (DE) .......................... 10 2010 014 969

(51) Int. Cl.
*B29C 67/24*   (2006.01)
*B29C 67/00*   (2006.01)

(52) U.S. Cl.
CPC ......... *B29C 67/0085* (2013.01); *B29C 67/0081* (2013.01)
USPC ........... 425/375; 425/215; 425/216; 425/217; 264/37.29; 264/308

(58) Field of Classification Search
CPC ............ B29C 67/0051; B29C 67/0085; B29C 67/0096; B08B 1/00; B08B 1/002; B08B 1/005
USPC .................. 264/37.29, 37.1, FOR. 101, 308; 425/215–218, 375, 174.4
See application file for complete search history.

(56) References Cited

U.S. PATENT DOCUMENTS

| 2,640,629 A | 6/1953 | McDonald et al. |
| 2,692,142 A | 10/1954 | Hunter |

(Continued)

FOREIGN PATENT DOCUMENTS

| AU | 720255 B2 | 5/2000 |
| DE | 4440397 | 9/1995 |

(Continued)

OTHER PUBLICATIONS

US 4,937,420, 06/26/1990, Deckard (withdrawn).

(Continued)

*Primary Examiner* — Amjad Abraham
*Assistant Examiner* — Ninh Le
(74) *Attorney, Agent, or Firm* — The Dobrusin Law Firm, PC (57) ABSTRACT

The present invention relates to a device for manufacture of three-dimensional models by means of a 3D printing process, whereby a spreader device is used to deposit particulate material in layers on a build platform and the particulate material flow, which occurs perpendicular to the spreading direction, is transferred into containers that are actively cleaned by sliders or brushes at the spreader device. It exploits the fact that particulate material that is moves dynamically can only bridge small height differences. The arrangement can be implemented in a space-saving manner beneath the spreading plane.

18 Claims, 6 Drawing Sheets

(56) References Cited

U.S. PATENT DOCUMENTS

| | | |
|---|---|---|
| 2,857,938 A | 10/1958 | Wahl |
| 3,616,969 A | 11/1971 | Koizumi |
| 3,616,972 A | 11/1971 | Christy |
| 3,815,527 A | 6/1974 | Dobbins |
| 3,884,401 A | 5/1975 | Winkler |
| 3,913,503 A | 10/1975 | Becker |
| 4,239,715 A | 12/1980 | Pratt |
| 4,279,949 A | 7/1981 | Esser |
| 4,369,025 A | 1/1983 | Von Der Weid |
| 4,575,330 A | 3/1986 | Hull |
| 4,579,252 A | 4/1986 | Wilson |
| 4,630,755 A | 12/1986 | Campbell |
| 4,665,492 A | 5/1987 | Masters |
| 4,669,634 A | 6/1987 | Leroux |
| 4,752,352 A | 6/1988 | Feygin |
| 4,863,538 A | 9/1989 | Deckard |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,248,456 A | 9/1993 | Evans, Jr. et al. |
| 5,252,264 A | 10/1993 | Forderhase et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,433,520 A | 7/1995 | Adams |
| 5,482,659 A | 1/1996 | Sauerhoefer |
| 5,490,962 A | 2/1996 | Cima et al. |
| 5,506,607 A | 4/1996 | Sanders, Jr. et al. |
| 5,555,176 A | 9/1996 | Menhennett et al. |
| 5,573,055 A | 11/1996 | Melling et al. |
| 5,597,589 A | 1/1997 | Deckard |
| 5,599,581 A | 2/1997 | Burton et al. |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,730,925 A | 3/1998 | Mattes et al. |
| 5,740,051 A | 4/1998 | Sanders, Jr. et al. |
| 5,753,274 A | 5/1998 | Wilkening et al. |
| 5,807,437 A | 9/1998 | Sachs et al. |
| 5,837,373 A | 11/1998 | Siak et al. |
| 5,851,465 A | 12/1998 | Bredt |
| 5,902,441 A | 5/1999 | Bredt et al. |
| 5,902,537 A | 5/1999 | Almquist et al. |
| 5,934,343 A | 8/1999 | Gaylo et al. |
| 5,943,235 A | 8/1999 | Earl et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,094,994 A | 8/2000 | Satake et al. |
| 6,116,517 A | 9/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,165,406 A | 12/2000 | Jang et al. |
| 6,169,605 B1 * | 1/2001 | Penn et al. .................. 358/1.1 |
| 6,193,922 B1 | 2/2001 | Ederer |
| 6,217,816 B1 | 4/2001 | Tang |
| 6,259,962 B1 | 7/2001 | Gothait |
| 6,305,769 B1 | 10/2001 | Thayer et al. |
| 6,316,060 B1 | 11/2001 | Elvidge et al. |
| 6,322,728 B1 | 11/2001 | Brodkin et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,467,525 B2 | 10/2002 | Herreid et al. |
| 6,476,122 B1 | 11/2002 | Leyden |
| 6,500,378 B1 | 12/2002 | Smith |
| 6,554,600 B1 | 4/2003 | Hofmann et al. |
| 6,610,429 B2 | 8/2003 | Bredt et al. |
| 6,733,528 B2 | 5/2004 | Abe et al. |
| 6,764,636 B1 | 7/2004 | Allanic et al. |
| 6,838,035 B1 | 1/2005 | Ederer et al. |
| 7,004,222 B2 | 2/2006 | Ederer et al. |
| 7,049,363 B2 | 5/2006 | Shen |
| 7,137,431 B2 | 11/2006 | Ederer et al. |
| 7,608,672 B2 | 10/2009 | Hachikian |
| 7,767,130 B2 | 8/2010 | Elsner et al. |
| 2001/0050031 A1 | 12/2001 | Bredt et al. |
| 2002/0026982 A1 | 3/2002 | Bredt et al. |
| 2002/0111707 A1 | 8/2002 | Li et al. |
| 2003/0083771 A1 | 5/2003 | Schmidt |
| 2004/0012112 A1 | 1/2004 | Davidson et al. |
| 2004/0035542 A1 | 2/2004 | Ederer et al. |
| 2004/0038009 A1 | 2/2004 | Leyden et al. |
| 2004/0056378 A1 | 3/2004 | Bredt et al. |
| 2004/0094058 A1 | 5/2004 | Kasperchik et al. |
| 2004/0145088 A1 | 7/2004 | Patel et al. |
| 2004/0170765 A1 | 9/2004 | Ederer et al. |
| 2005/0017394 A1 | 1/2005 | Hochsmann et al. |
| 2005/0093194 A1 | 5/2005 | Oriakhi et al. |
| 2005/0167872 A1 | 8/2005 | Tsubaki et al. |
| 2006/0105102 A1 | 5/2006 | Hochsmann et al. |
| 2006/0175346 A1 | 8/2006 | Ederer et al. |
| 2008/0001331 A1 | 1/2008 | Ederer |
| 2008/0047628 A1 * | 2/2008 | Davidson et al. .............. 141/18 |
| 2009/0011066 A1 * | 1/2009 | Davidson et al. .............. 425/215 |
| 2010/0247742 A1 * | 9/2010 | Shi et al. .......................... 427/8 |

FOREIGN PATENT DOCUMENTS

| | | | |
|---|---|---|---|
| DE | 19545167 A1 | 6/1997 | |
| DE | 69634921 T2 | 12/2005 | |
| EP | 0361847 B1 | 4/1990 | |
| EP | 1415792 | 5/2004 | |
| EP | 1442870 | 8/2004 | |
| FR | 2790418 | 9/2000 | |
| GB | 2382798 | 6/2003 | |
| WO | 95/18715 A1 | 7/1995 | |
| WO | 95/34468 A1 | 12/1995 | |
| WO | WO 9534468 A1 * | 12/1995 | ............ B65B 1/04 |
| WO | 96/05038 A1 | 2/1996 | |
| WO | 00/21736 A1 | 4/2000 | |
| WO | 00/51809 A1 | 9/2000 | |
| WO | 01/34371 A2 | 5/2001 | |
| WO | 02/064353 A1 | 8/2002 | |
| WO | 02/064354 A1 | 8/2002 | |
| WO | 03/016030 A1 | 2/2003 | |
| WO | 03/016067 A2 | 2/2003 | |
| WO | 2004/010907 A1 | 2/2004 | |

(56) References Cited

FOREIGN PATENT DOCUMENTS

OTHER PUBLICATIONS

Cima et al., "Computer-derived Microstructures by 3D Printing: Bio- and Structural Materials," SFF Symposium, Austin, TX, 1994.

Sachs et al., "Three-Dimensional Printing: Rapid Tooling and Prototypes Directly from a CAD Model", Massachusetts Institute of Technology, pp. 131-136.

Sachs et al., "Three-Dimensional Printing: Rapid Tooling and Prototypes Directly from a CAD Model", Massachusetts Institute of Technology, pp. 143 & 151, Jan. 1990.

Jacobs et al., 2005 SME Technical Paper, title "Are QuickCast Patterns Suitable for Limited Production?"

Feature Article—Rapid Tooling—Cast Resin and Sprayed Metal Tooling by Joel Segal, Apr. 2000.

Williams, "Feasibility Study of Investment Casting Pattern Design by Means of Three Dimensional Printing", Department of Mechanical Engineering, pp. 2-15, Jun. 1987.

Gebhart, Rapid Prototyping, pp. 118-119, 1996.

Marcus et al., Solid Freeform Fabrication Proceedings, Nov. 1993.

Marcus, et al., Solid Freeform Frabrication Proceedings, Sep. 1995, p. 130-33.

Related U.S. Appl. No. 10/510,543, filed Apr. 8, 2003, publication No. 2006/0105102.

Related U.S. Appl. No. 10/473,301, filed Apr. 26, 2002, publication No. 2004/0170765.

Translation of Written Opinion, Application No. PCT/DE2011/000385, dated Apr. 14, 2010.

\* cited by examiner

DEVICE FOR PRODUCING THREE-DIMENSIONAL MODELS

CLAIM OF PRIORITY

This application is a national phase filing under 35 USC §371 from POT Application serial number PCT/DE2011/000385 filed on Apr. 11, 2011, and claims priority therefrom. This application further claims priority from DE 10 2010 014 969.1 filed Apr. 14, 2010 on both incorporated herein by reference.

The invention relates to a device for manufacturing three-dimensional models as expressed in the generic concept of patent claim 1.

Methods for producing three-dimensional components by layerwise depositing of material have been known for some time.

For example, a method for producing three-dimensional objects from computer data is described in the European patent specification EP 0 431 924 B1. In this method, a particulate material is deposited in a thin layer onto a platform, and a liquid binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which the remaining particulate material is removed, e.g. by brushing.

Other particulate material-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

During the spreading process that generates a particulate material layer, there occur, for example, as is known from U.S. Pat. No. 6,375,874 B1, particulate material flows perpendicular to the spreading movement direction. This must be controlled.

This especially applies if a print head has to be moved close to the particulate material since a contact of the print head with the particulate material can influence the print head operation or even lead to its destruction. In U.S. Pat. No. 6,375,874 E1 a device is described that prevents such a particulate material flow by attaching a scraper laterally to the spreader device that closes the space between the spreader device and the top deck of the machine. However, the disadvantages to this type of design are parts moving in opposite directions to each other and the frictional connections, which tend to jam when particulate material is present. There is also wear due to the moving parts.

In the case of other variants, such as laser sintering of particulate material, spreader devices are used to which no special attention has been paid regarding the side area. An example is that which can be derived from the drawings and description in DE 10 2006 053 121, in which the edge area is implemented in a box-like manner and the "edge problems" are not taken into consideration. In the case of laser sintering, accumulations of particulate material at the edge are considered noncritical.

OBJECT OF THE INVENTION

It must be ensured that in the motion range of the print head no particulate material accumulations occur with which the print head might come in contact. The device must work simply and reliably to this purpose and should therefore not have any active suction apparatuses or cleaning systems.

If the spreader device, such as described in e.g. EP1377389B1, exhibits a leveling element over the entire build area width, then it is not expected that particulate material accumulations occur in the build area.

At the spreading start point and at the end of the spreading path it is possible to implement recesses such as those described in DE10216013B4. These possess a volume for reception of particulate material located under the build area. The spreader device is to be controlled in such a manner that overflows, which are created during spreading, are securely transported into the containers.

During the work step of the spreader device, a certain quantity of particulate material will accumulate, which is immediately leveled. Due to vibration, particulate material leaks out from a gap that almost spans the entire width to be coated. Depending on the flow properties of the particulate material, a particulate material flow occurs perpendicular to the travel motion of the spreader device. If the particulate material flow reaches the end of the leveling blade, then little by little a "particulate material pile" results, which presents a risk of contact between the print head and the particulate material.

One option for solving this problem is to extend the width of the leveling blade beyond the area of the leak gap. In this manner, the development of "piling" is temporarily delayed. If the width is sufficient, then building can proceed contact-free—and therefore damage-free—until the end of the build job.

This option does not always exist since, depending on the flow properties of the particulate material, the machine dimensions may not be sufficient to provide adequate space for a suitable width extension of the leveling blade.

Another option exists ran that containers are used around the build area as shown in WO199534468A1.

However, containers along the sides of the build area are difficult to implement when using an interchangeable job-box system for the build space and the build platform.

For example, the job box could be inserted beneath the containers. This means an additional enlargement of the overall height of the device, which cannot be used during the build process.

It is also conceivable to design the container in a swivelable manner, thus enabling removal of the job-box frame.

A further variant would include additional containers mounted laterally on the job box for reception of particulate material overflow. However, this requires a larger build chamber.

In all cases, the embodiment requires an emptying stem after each build job. It is therefore appropriate and economical if the spreader device itself cleans way the laterally resulting overflow quantities into corresponding recesses.

For the purpose of more detailed explanation, the invention is described in further detail below on the basis of preferred embodiments with reference to the drawing.

In the drawing.

Figure 1:
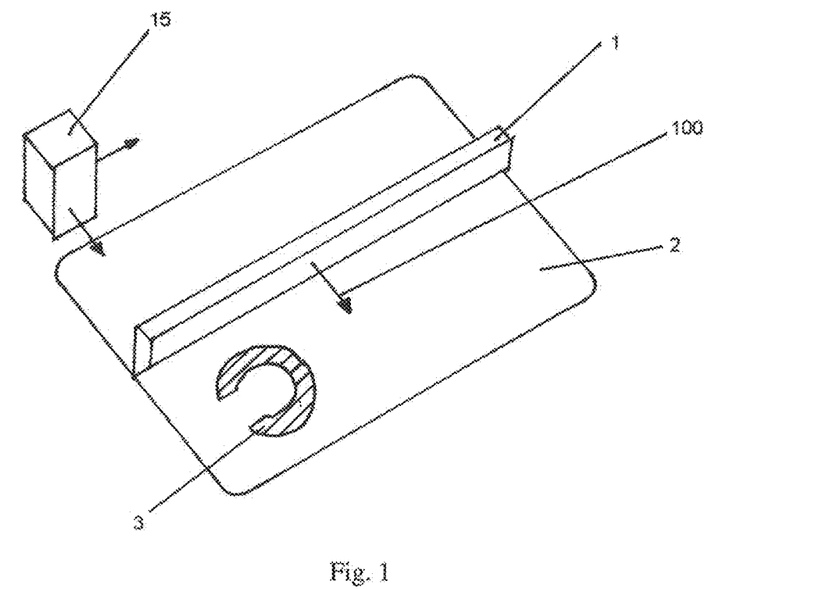
FIG. 1 A spatial representation of a 3D printing device according to the state of technology.

The object of the spreader device (1) to apply thin particulate material layers to the build area (2), which are then selectively bonded with the aid of a print head (15) in correspondence with the model data of the current cross-section (3) (FIG. 1). In so doing, the spreader device (1) first moves to its start position over a front collecting recess (5), which extends over the entire width of the build area (2) perpendicular to the direction of spreading (100). The build platform (7) is lowered by one layer thickness, which typically lies in the range of 0.05 mm-0.5 mm, and the spreader device (1) starts to move. While it passes over the build area, the particulate material flow is switched on and the layer is filled with particulate material. Since the particulate material quantity cannot be exactly adjusted to the volumes to be filled, an overflow quantity in the form of a particulate material roll (10) is created, which is pushed in the rear collecting recess. Like the front collecting recess, this is located perpendicular to the spreading direction over the entire width of the build area, however on the opposite side. Because the overflow quantity at the spreader device corresponds to the approximate volume of one layer, the rear collecting recess should be able to contain more particulate material than is required for filling the build volume.

Figure 2:
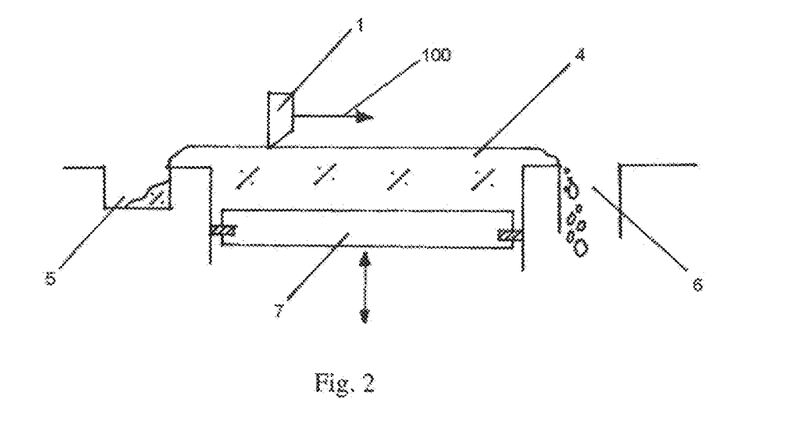
FIG. 2 A side sectional view of one preferred embodiment of the present invention.
Figure 3:
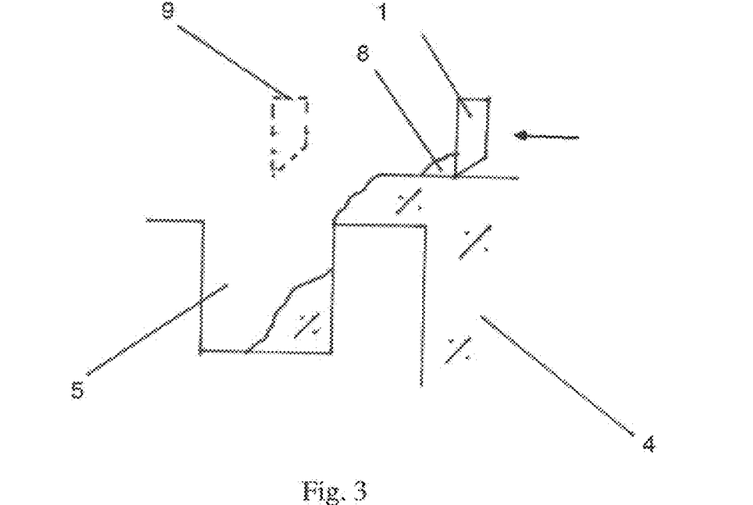
FIGS. 3 and 4 Various representations of the spreading process of the present invention, shown in side sectional view.
Figure 4:
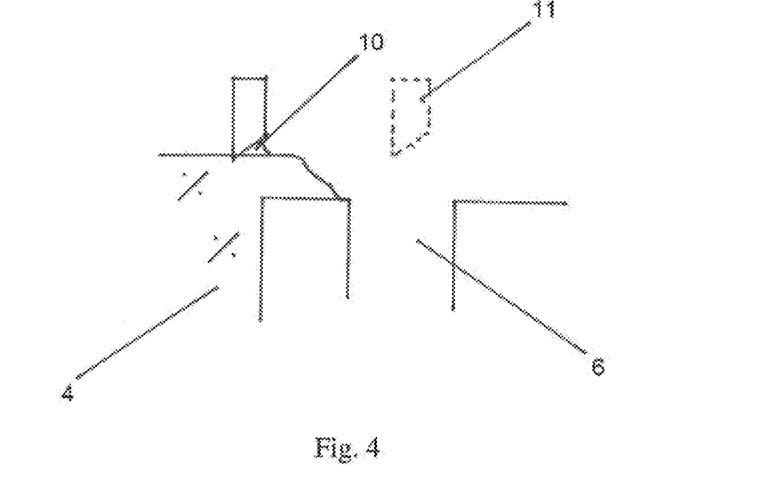

The rear end position corresponds to Position (11) (FIG. 2 and FIG. 4). The spreader device also creates a particulate material roll (8) during the move to the start position. This results due to the inaccuracies and elasticity in the particulate material. Because of this, the start position (9) must also be located over a collecting recess (5). Because this particulate material roll (8) is significantly smaller than that during the move in the reverse direction (10), the front collecting recess (5) can be significantly smaller than the rear recess (6).

If the build space of the machine is defined by a job box, then special considerations must be taken into account. If the overall height of the machine is to be kept small, then the job box can only be brought out of the machine parallel to the collecting recesses.

Figure 5:
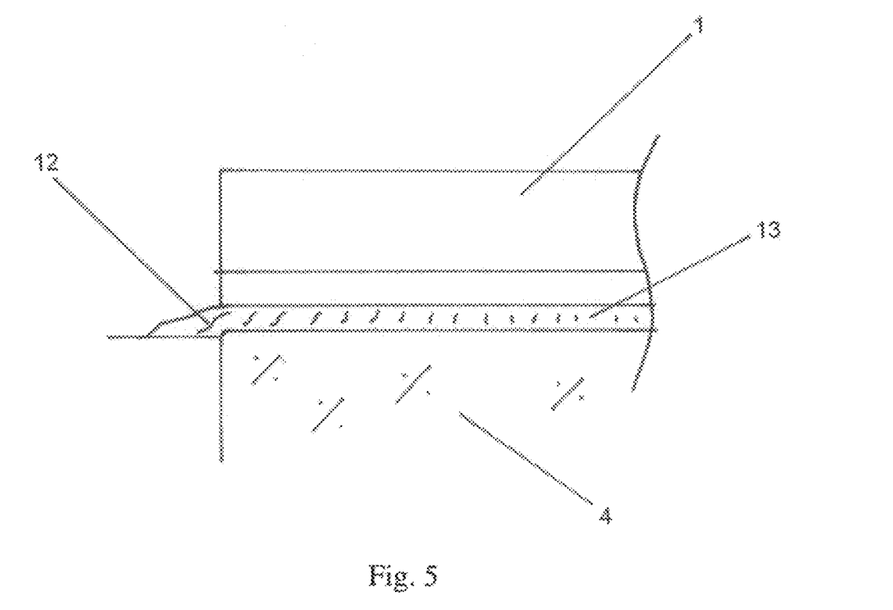
FIGS. 5 to 7 Detail sectional view at the spreader device of a 3D printing device according to the state of technology, at various points in time during the build process.
Figure 6:
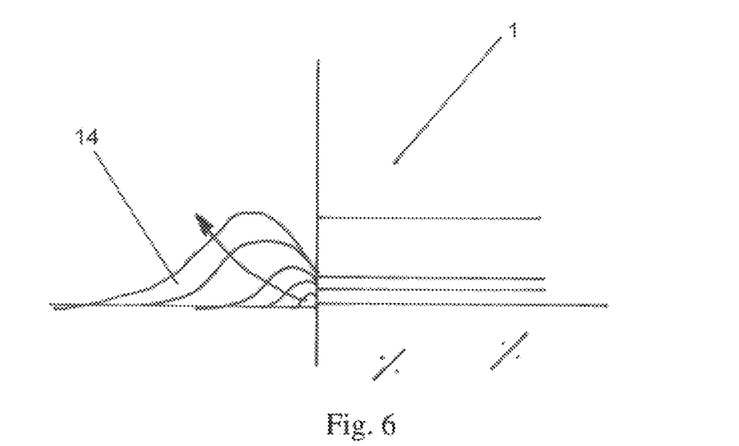

During the spreading process, there occur both the desired particulate material flows as well as the undesirable flows. For example, particulate material is pushed out lateral to the spreader device and perpendicular to the spreading direction (100), which (12) extends beyond the build area edge, A "hill" (14) grows after multiple spreading processes. The height of such is determined by the size of the particulate material roll and the dynamics of the forward motion of the spreader device (FIG. 5 and FIG. 6).

Figure 7:
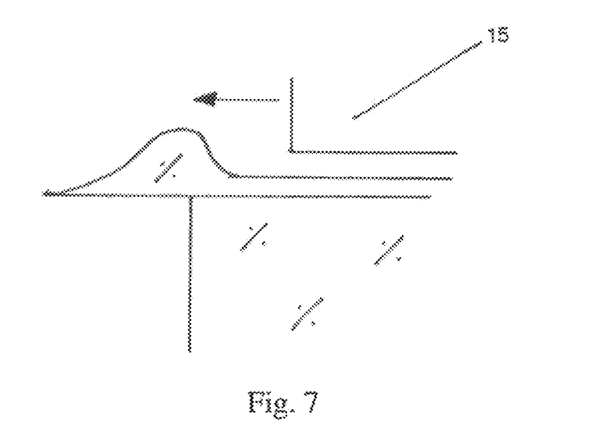

If the "hill" (14) grows to a certain size, then the print head (15) may come in contact with particulate material during its movement and thereby be damaged (FIG. 7). During the process, the distance of the print head from the build area plane normally amounts to only a few mm, generally just 1-3 mm. It is therefore easy to understand that even the smallest particulate material amassments the movement area of the print head can cause problems.

Figure 8:
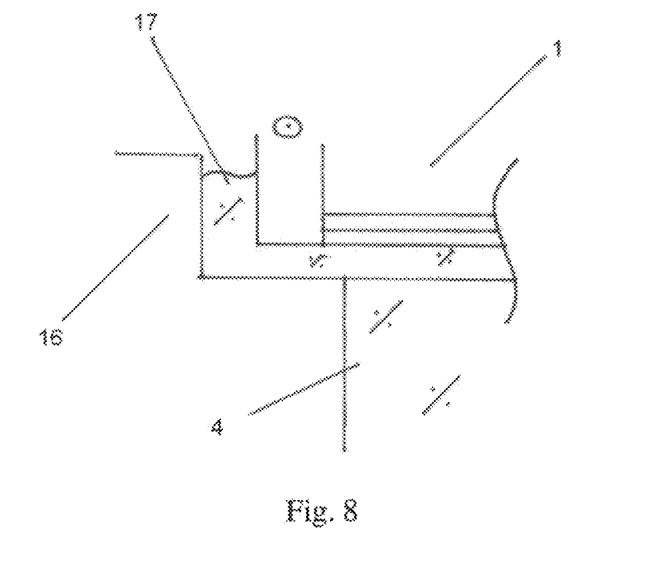
FIGS. 8 and 9 Detail sectional view at the spreader device of one preferred embodiment of the present invention, at various points in time during the build process.
Figure 9:
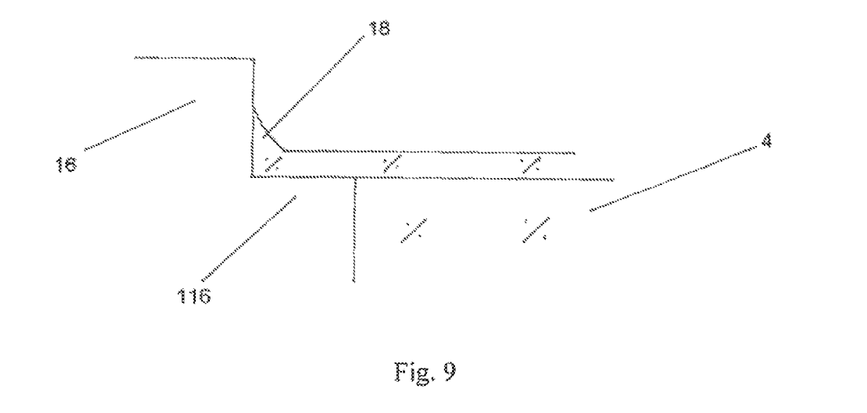

According to the invention, this problem can be eliminated by a landing (16) in the build area's delimitation (116), which is parallel to the movement direction of the spreader device along the build area (2). Now the particulate material (4) does not rise over the level (17) during a spreading process (FIG. 8). It suffices that the landing height extends just a few mm over the spreading plane. After the spreader device (1) passes over, a material cone (angle of repose) (18) is formed whose volume is further reduced during the spreader device's return pass. This results in an equilibrium between the overflow quantity created and the "clean-up" in the edge area.

This behavior corresponds to the fluid character of the moving particulate material. The liquid does not flow over the more elevated landing. If the spreader device amasses a "wave", then the landing must be pulled up higher.

Since the landing (is situated over the particulate material layer leveled by the spreader device, the distance from the print head (15) to the landing edge is reduced. This increases the probability of a collision. Therefore the following embodiment of the above-described invention is especially preferred.

Figure 10:
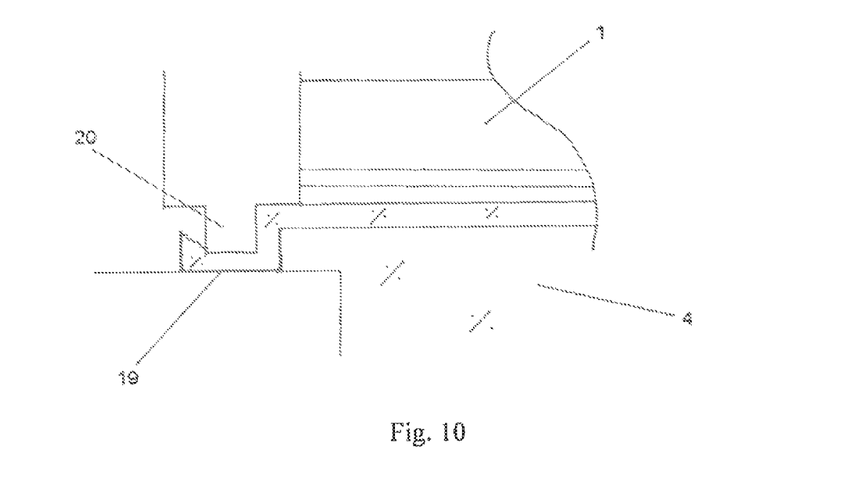
FIGS. 10 and 11 Detail sectional view at the spreader device of a further preferred embodiment of the present invention, at various points in time during the build process.

The landing (16) is implemented as a small serrated cavity (19). This can be designed at a low level since the greatest overflow quantities are transported by a slide (20) into the large-volume front and rear collecting recesses (FIG. 10). Such a container preferentially exhibits a width of 5-20 mm and a depth of 2-10 mm. This system surprisingly functions like the above-described landing (16), although all the constructional parts are located under the plane created by the spreader device. Experiments show that even extremely flowable particulate material does not form any growing "hills" with the construction according to the invention.

A likewise especially preferred embodiment of the invention uses brushes to evacuate the channel (19) instead of the slider (20). In comparison to a slider (20), this enables a higher tolerance of the system against geometric inaccuracies.

Figure 11:
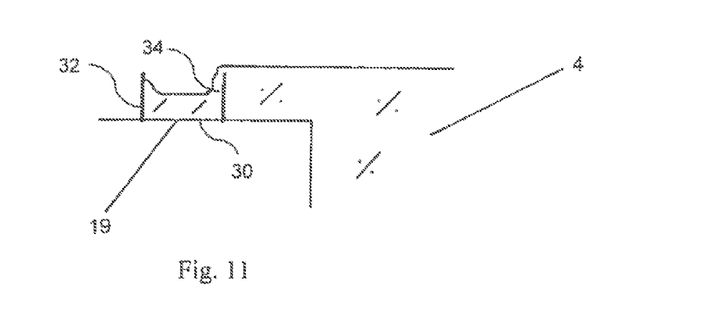
Figure 12:
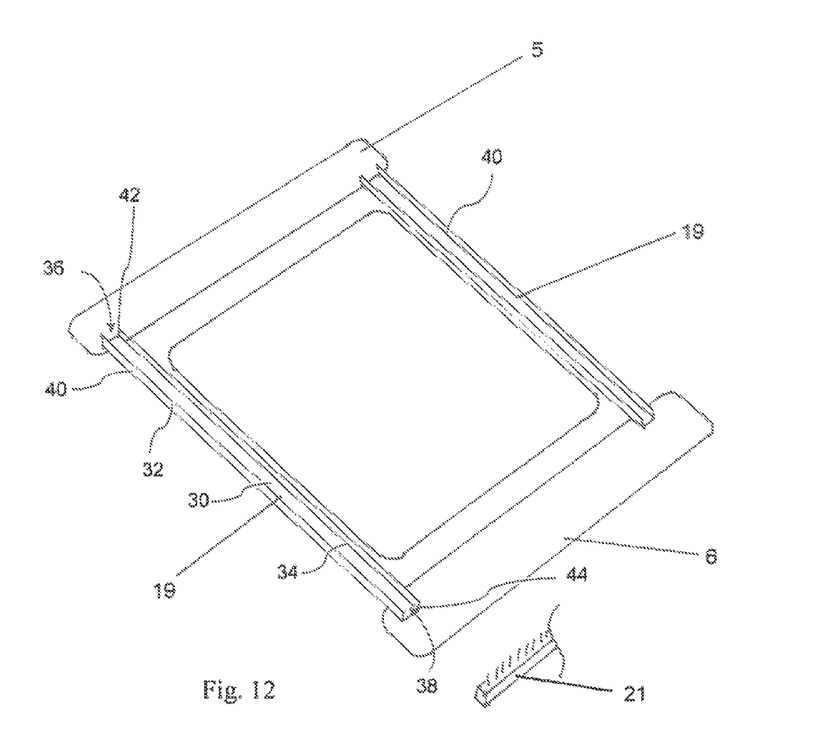
FIG. 12 A spatial representation of the according to one preferred embodiment of the invention.

A container (19) preferably has opposing side was (32, 34), such as illustrated in FIG. 11. The opposing side walls (32, 34 may be generally vertical walls. The opposing side walls (32, 34) may be parallel. The opposing side walls (32, 34) preferably are solid walls (i.e., free of holes or other openings). The container (19) preferably has a floor (30). The floor (30) may be a solid floor (i.e., free of holes or other openings). The containers (19) are arranged in such a manner that the particulate material respectively cleared into the front (5) or rear (6) collecting recess. In doing so, any rigid obstacles (2) in the path of the spreader device deflect the brushes. The container may be a channel (40), such as illustrated in FIG. 12. Preferably, the channel (40) has opposing side walls (32, 34) that generally run the length of the build platform in the spreading direction. The opposing side walls (32, 34) preferably are connected. The channel (40) preferably is solid (i.e., free of holes or other openings) through the length of the build platform (2) in the direction of spreading (100). The channel may be generally horizontal. The channel (40) has a front end (42) and an opposing rear end (44) The channel (40) may have a front opening (36) for a front collecting recess (5), a rear opening (38) for a rear collecting recess (6), or both. For example, the channel (40) may have a front opening (36) over a front collecting recess and a rear opening (38) over a rear collecting recess (6). Preferred openings (36, 38) are at the end of the channel (40). The floor (30) may be generally horizontal. The floor (30) may run the length of the build platform (2) in the direction of spreading (100). The container (19) preferably is an open container (i.e., free of a cover), such as illustrated in FIG. 12.

A favorable side effect of the invention is an exactly defined particulate material bed, which requires less cleaning effort and appears more attractive.

| Designation List | |
|---|---|
| 1 | Spreader device |
| 2 | Spreading plane |
| 3 | Model |
| 4 | Particulate material |
| 5 | Rear recess |
| 6 | Front recess |
| 7 | Building platform |
| 8 | Particulate material roll during the work step |
| 9 | Start position |
| 10 | Particulate material roll during the empty pass |
| 11 | End position |
| 12 | Overflow quantity |
| 13 | Particulate material layer |
| 14 | Growing powder accumulation |
| 15 | Print head |
| 16 | Landing |
| 17 | Dynamic powder level |
| 18 | Material cone (angle of repose) at the landing |
| 19 | Channel |
| 20 | Slide |
| 21 | Brush for cleaning off of the spreader device blade |
| 100 | Spreading direction |
| 116 | Build area delimitation |

The invention claimed is:

1. A device for manufacture of models comprising: a particulate material that is deposited in layers on a build platform by means of a spreader device and then selectively printed with a second material likewise deposited in layers and these two application steps are repeated until a desired model is achieved,
wherein the spreader device transports incurring overflow quantities of the particulate material in a direction perpendicular to a spreading direction into at least one container, wherein sliders are mounted at the spreader device and act upon the container and move the particulate material therein with the spreader device,
wherein the container is a channel running the length of the build platform in the spreading direction, the channel having a front end and an opposing rear end, wherein the front end has an opening for flow of material into a front discharge recess and/or the rear end has an opening for flow of material into a rear discharge recess, wherein the container has opposing solid side walls running the length of the build platform in the spreading direction.

2. The device according to claim 1, wherein the at least one container is located along a side of the build platform, in the spreading direction.

3. The device according to claim 1, wherein the container is entirely located beneath a spreading plane of the particulate material.

4. The device according to claim 1, wherein the container is connected with the discharge recesses, which are located alongside front and rear edge of the build platform, perpendicular to the spreading direction, so that particulate material can flow from the container into the discharge recesses.

5. The device according to claim 1, wherein the sliders are provided with brushes that act upon the container.

6. A device according to claim 2, wherein the container is entirely located beneath a spreading plane of the particulate material.

7. The device according to claim 2, wherein the container is connected with the front discharge recess and the rear discharge recess, which are located alongside the front and rear edge of the build platform, perpendicular to the spreading direction, so that particulate material can flow from the container into the recesses.

8. The device according to claim 7, wherein the sliders are provided with brushes that act upon the container.

9. The device of claim 1, wherein the container is an open container, without a cover.

10. The device of claim 1, wherein the container has a horizontal floor running the length of the build platform in the spreading direction, wherein the floor is a solid floor.

11. The device of claim 1, wherein the front end of the channel has an opening that opens over the front discharge recess or the rear end of the channel has an opening that opens over the rear discharge recess.

12. The device of claim 1, wherein the front end of the channel has an opening that opens over the front discharge recess and the rear end of the channel has an opening that opens over the rear discharge recess.

13. The device of claim 12, wherein the container has a horizontal floor running the length of the build platform in the spreading direction, wherein the floor is a solid floor.

14. The device of claim 13, wherein the container is an open container, without a cover.

15. A device for manufacture of models comprising:
a) a build platform;
b) a spreader device for depositing a particulate material in layers on the build platform;
c) a printer for selectively printing a second material in layers on the build platform;
d) at least one container for receiving overflow quantities of the particulate material; and
e) sliders mounted proximate to the spreader device so that the sliders move the overflow quantities of the particulate material with the spreader device;
wherein the spreader device transports the overflow quantities of the particulate material in a direction perpendicular to a spreading direction into the at least one container and
wherein the at least one container is located along a side of the build platform, the container is a channel running the length of the build platform in the spreading direction, the channel having a front end and an opposing rear end, wherein the front end has an opening for flow of material into a front discharge recess and/or the rear end has an opening for flow of material into a rear discharge recess, wherein the container has opposing solid side walls running the length of the build platform in the spreading direction.

16. The device of claim 15, wherein the container is entirely located beneath a spreading plane of the particulate material.

17. The device according to claim 16, wherein the sliders are provided with brushes that act upon the container.

18. The device according to claim 17, wherein the container is connected with the front discharge recess and the rear discharge recess, which are located alongside the front and rear edge of the build platform, perpendicular to the spreading direction, so that particulate material can flow from the container into the recesses.

* * * * *